(12) United States Patent
Halford et al.

(10) Patent No.: US 9,084,112 B2
(45) Date of Patent: Jul. 14, 2015

(54) SECURE GROUP KEY AGREEMENT FOR WIRELESS NETWORKS

(71) Applicant: TrellisWare Technologies, Inc., San Diego, CA (US)

(72) Inventors: Thomas R. Halford, Manhattan Beach, CA (US); Thomas A. Courtade, Santa Monica, CA (US); Keith M. Chugg, La Cañada Flintridge, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 65 days.

(21) Appl. No.: 14/053,050

(22) Filed: Oct. 14, 2013

(65) Prior Publication Data

US 2015/0104017 A1 Apr. 16, 2015

(51) Int. Cl.
*H04L 29/00* (2006.01)
*H04W 12/04* (2009.01)
*H04L 9/14* (2006.01)

(52) U.S. Cl.
CPC ................. *H04W 12/04* (2013.01); *H04L 9/14* (2013.01); *H04L 2209/24* (2013.01)

(58) Field of Classification Search
CPC combination set(s) only.
See application file for complete search history.

(56) References Cited

PUBLICATIONS

Zhiguo et al, Anonymous ID-based Group Key Agreement for Wireless Networks, 2008, 2615-2620.*

* cited by examiner

*Primary Examiner* — Ghazal Shehni
(74) *Attorney, Agent, or Firm* — Kilpatrick Townsend & Stockton LLP

(57) ABSTRACT

A method for secure key agreement among a subset of a plurality of transceivers includes generating a first ordered subset of a plurality of keys $k_{\lambda,j}$, where j=0 to S. Each of the subset of the plurality of transceivers may possess at least one of the plurality of keys $k_{\lambda,j}$ from the first ordered subset. Each of the subset of the plurality of transceivers possessing one or more keys $k_{\lambda,i}$, i=1 to S, also possesses at least one key from a second ordered subset of the plurality of keys $k_{\lambda,j}$, j=0 to i−1. A key with index λ0 is designated as a group key. A binary sum of the group key $k_{\lambda,0}$ and a key $k_{\lambda,j}$, where j≠0, is transmitted from one or more of the subset of the plurality of transceivers that possesses the group key $k_{\lambda,0}$.

19 Claims, 2 Drawing Sheets

SECURE GROUP KEY AGREEMENT FOR WIRELESS NETWORKS

GOVERNMENT LICENSE RIGHTS

This invention was made with government support under W911QX-13-C-0010 awarded by the U.S. Army (Army Contracting Command (ACC)—Aberdeen Proving Ground (APG)). The government has certain rights in the invention.

FIELD OF THE INVENTION

The present invention relates to a system and a method whereby a group of nodes in a wireless network exchange messages so as to securely agree upon a group key.

BACKGROUND

As wireless networks become an increasingly indispensable part of our personal and professional lives, securing these communication systems becomes increasingly important. The wireless communications used in wireless networks present potential security vulnerability. Specifically, an eavesdropper can overhear transmissions that are intended for another node in the network. In wireless networks, cryptography can be used to ensure that only authorized nodes are able to read the data contained in received transmissions. That is to say, cryptography can be used to ensure the confidentiality of sensitive data, even when malicious eavesdroppers are present in the network.

Cryptography is the art and science of keeping data secure. In a wireless network, an encryption method operating at a data source can transform a data sequence into a secret using an encryption key. In the parlance of cryptography, the original data sequence is the plaintext and the secret is the ciphertext. Upon reception of the ciphertext, a decryption process operating at an authorized destination node transforms the ciphertext back into the original data sequence using a decryption key. The security of an encryption process is typically measured by the amount of computational resources that an eavesdropper must expend to obtain the plaintext from the ciphertext if that eavesdropper does not possess the decryption key. For example, an encryption process is said to be 80-bit secure if an eavesdropper requires at least $2^{80}$ computing operations to recover the plaintext. Examples of cryptographic techniques include one-time pads, symmetric key algorithms, public key algorithms, and key derivation functions.

A one-time pad is a common, random string of bits that is shared by the source and authorized destination of a data sequence. For example, the one-time pad might be the 32-bit sequence:

$p=\{1,1,0,1,1,0,0,1,1,1,0,1,1,0,1,0,0,1,1,1,1,0,1,1,1,1,1,0,1,0,1,0\}$.

When the source wishes to transmit a 32-bit data sequence d to the intended destination, $d=\{1,0,0,1,1,0,1,0,0,0,1,1,0,0,0,1,1,1,0,1,1,0,0,0,1,0,1,0,1,0,1,1\}$, it computes the exclusive or (XOR) of each bit of the data sequence d and each bit of the one-time pad p to produce the ciphertext c:

$c=p\oplus d=\{0,1,0,0,0,0,1,1,1,1,1,0,1,0,1,1,1,0,1,0,0,0,1,1,0,1,0,0,0,0,0,1\}$.

Since XORing with the same binary value twice restores the original value, the destination recovers the data sequence by computing:

$$p\oplus c=p\oplus p\oplus d=d \qquad \text{Equation (1)}$$

If an eavesdropper obtains the first bit of the ciphertext but does not know the first bit of the one-time pad, then it cannot distinguish whether the first bit of the data sequence was a 1 or a 0 because both $0\oplus 0=0$ and $1\oplus 1=0$. In this case, the best an eavesdropper can do is to randomly guess whether than bit is a 0 or a 1. More generally, the best an eavesdropper can do is guess the value of each of the 32 bits in the data sequence. This scheme is therefore 32-bit secure.

One-time pads are a type of symmetric key algorithm. The term "symmetric" is used to indicate that the same key is used for encryption and for decryption. The Advanced Encryption Standard (AES) is a sophisticated symmetric key algorithm that is used in many commercial and military wireless networks. The encryption and decryption processes in symmetric key algorithms are typically very computationally efficient.

Public key algorithms are designed so that the encryption key and decryption key are different, but mathematically linked. In a public key algorithm, a node will typically generate a random string of bits and derive an encryptiondecryption key pair from that random string. The encryption key is made publically available to the other nodes while the decryption key remains private. The cryptographic strength of a public key algorithm lies in the computational difficulty of determining a private key from the corresponding public key. The RSA Algorithm—which is named after its inventors Ron Rivest, Adi Shamir, and Leonard Adleman—is a widely used public key algorithm. The encryption and decryption processes in public key algorithms are generally much more computationally complex than those in symmetric key algorithms.

In many applications, it is desirable to be able to generate multiple temporary keys from an underlying persistent key. In such applications, the temporary keys are called "session keys" while the persistent keys are called "master keys". A master key, for example, may be generated based on deterministic random bit generators (DRBG), also known as a pseudorandom number generator. In another example, the master key may be generated using a non-deterministic random bit generator. A key derivation function (KDF) is the mathematical tool used to generate a session key from a master key and some other input (e.g., a unique identifier for the session). In an embodiment, a KDF $\phi()$ may produce an output key $s_{j,i}$ that is a function of the input key $k_j$ and the session identifier i:

$$s_{j,i}\leftarrow\phi(k_j,i) \qquad \text{Equation (2)}$$

The cryptographic strength of a KDF lies in the computational difficulty of determining a master key from the corresponding session key. A common KDF that is typically used is the hash-based message authentication code (HMAC).

Relying solely on symmetric key algorithms is often undesirable in a wireless network. For example, consider a military use case where every soldier in a squadron is given a radio that is pre-loaded with a common symmetric key prior to a mission. If, during the course of the mission, one of those radios falls into enemy hands, then all future intra-squad communications could be compromised. Owing to the relative complexity of public key encryption and decryption, however, relying solely on public key algorithms is also often undesirable. Many wireless networks therefore employ the following combination of public and symmetric key algorithms for secure communications between pairs of nodes:

A source node "Alice" transmits a plaintext message to a destination node "Bob" indicating that she wishes to initiate a secure unicast session with him.

Bob generates a public/private key pair for the public key algorithm and transmits his public key to Alice as plaintext.

Alice generates a session key for the symmetric key algorithm, encrypts it using Bob's public key, and transmits the session key as ciphertext to Bob.

Bob uses his private key to decrypt the received ciphertext, thereby recovering the plaintext session key.

Alice and Bob now share a common cryptographic key that can be used for encryption and decryption via the symmetric key algorithm.

In many wireless networking scenarios it is insufficient to provide only for secure unicast communications. For example, the data traffic in military wireless networks is generally encrypted and is often multicast in nature—i.e., it is transmitted from one source to many destinations simultaneously. The procedure outlined above for secure unicast communications can be generalized to secure multicast communications as follows:

Alice transmits a plaintext message to the T multicast destinations indicating that she wishes to initiate a secure multicast session.

Each of the T destinations generates a unique public/private key pair for the public key algorithm and transmits its unique public key to Alice as plaintext.

Alice generates a session key for the symmetric key algorithm.

Alice encrypts and transmits the session key to each of the T destinations separately using the corresponding public keys.

Each destination uses its unique private key to decrypt the ciphertext message that it receives, thereby recovering the plaintext session key.

Alice and all of the destinations now share a common cryptographic key that can be used for encryption and decryption via the symmetric key algorithm.

Observe that the number of messages required to initiate the secure multicast session grows linearly with the number of destinations T. For large multicast groups, this procedure will therefore be inefficient. Suppose instead that the destination nodes already shared a common random bit string—i.e., a group key. If this were the case, then the secure multicast session could be initiated as follows:

Alice transmits a plaintext message to the T multicast destinations indicating that she wishes to initiate a secure multicast session.

The T destinations generate a common group public/group private key pair from the shared group key.

One of the T destinations transmits the group public key to Alice.

Alice generates a session key, encrypts it using the group public key, and transmits the session key as ciphertext to all destinations simultaneously.

All of the destinations use the common group private key to decrypt the received ciphertext, thereby recovering the plaintext session key.

Alice and all of the destinations now share a common session key that can be used for encryption and decryption via the symmetric key algorithm.

Comparing the multicast procedures described above, it is clear that provided a group key can be established among T nodes with a number of transmissions that grows sublinearly with T, then the latter procedure will be more efficient than the former in terms of number of transmissions required to establish the session key for a secure multicast session.

SUMMARY

In view of the foregoing background, a method and system for generating a common secret among a subset of nodes in a wireless network is proposed. In an embodiment, a set of master keys may be distributed among the wireless nodes such that any pair of nodes share at least one master key. In order to establish a cryptographic key among a given subset of the nodes (the "group"), an ordered subset $\{k_{\lambda,0}, k_{\lambda,1}, \ldots, k_{\lambda,S}\}$ of the master key set may be identified satisfying two conditions:

1) Each node in the group may possess at least one of the keys in the ordered subset.
2) For each $i=1, \ldots, S$, the master key $k_{\lambda,i}$ may be possessed by at least one node which also possesses at least one of the master keys $k_{\lambda,j}$ for $j=0, \ldots, i-1$.

Each node in the group may generate a session key corresponding to each key in the ordered subset that it possesses using a common key derivation function. The session key derived from the master key $k_{\lambda,0}$ may be the desired cryptographic key for the group (the "group key"). The group key may be distributed to all nodes in the group not initially in possession of $k_{\lambda,0}$ via the sequence of S transmissions for $i=1, \ldots, S$:

1) A node possessing the group key and the master key $k_{\lambda,i}$ may transmit the binary sum of the group key and the session key derived from $k_{\lambda,i}$.
2) Each node not in possession of the group key, but in possession of the master key $k_{\lambda,i}$, may recover the group key from that transmission by computing the binary sum of that transmission and the session key derived from $k_{\lambda,i}$.

In this manner, the group key may be distributed to all nodes in the group via S transmissions. None of these transmissions reveal the group key since for each transmission, a session key derived from a master key may be used as a one-time pad.

An object of the present invention is to enable a group of nodes which are not already in possession of a common cryptographic key to establish a common cryptographic key via transmissions over a possibly insecure wireless channel.

Another object of the present invention is to establish a cryptographic key among a group of nodes via a sequence of S wireless transmissions where S is less than the number of members of the group.

Yet another object of the present invention is to prevent an adversary who obtains a group key for one communications session to use that group key to compromise the group keys for past or future communications sessions.

Other objects and advantages of the present invention will be set forth in the description that follows as would understood by one of ordinary skill in the art.

DETAILED DESCRIPTION

Figure 1:
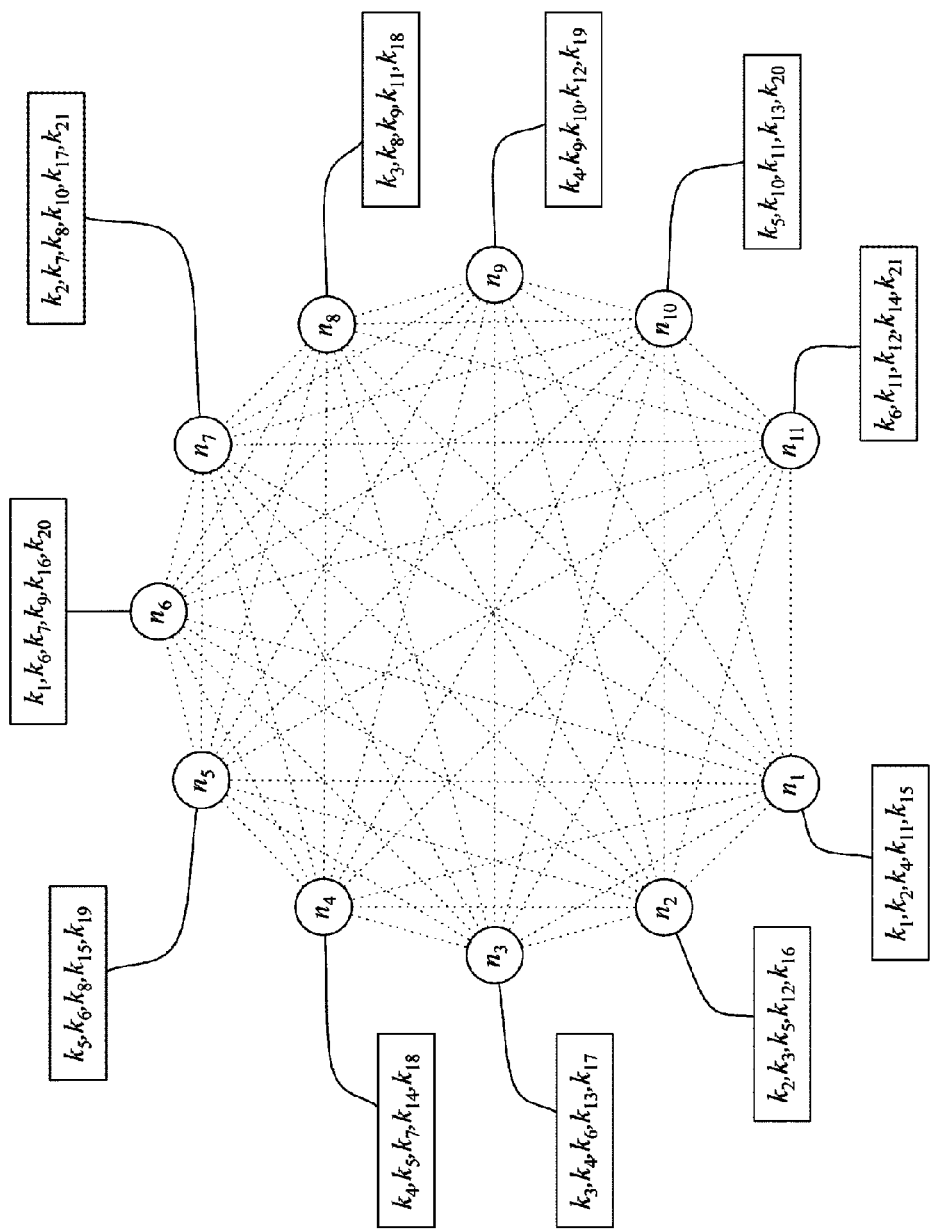
FIG. 1 is a simplified diagram of a wireless network comprising eleven (11) nodes labeled $n_1, n_2, \ldots, n_{11}$. Each node can communicate with every other node over a common wireless channel. A total of 21 master keys, labeled $k_1, k_2, \ldots, k_{21}$, are distributed amongst those 11 nodes. The master keys available to each node are indicated in FIG. 1. For example, node $n_1$ possesses 5 master keys: $k_1, k_2, k_4, k_{11}$, and $k_{15}$.

It is instructive to consider a specific example as a means of establishing the terminology that will be used herein. FIG. 1 illustrates a wireless network comprising 11 nodes labeled $n_1$, $n_2, \ldots, n_{11}$. In this example, a total of 21 master keys are initially distributed amongst the nodes according to the distribution illustrated in FIG. 1. For example, node $n_1$ is loaded with 5 master keys: $k_1$, $k_2$, $k_4$, $k_{11}$, and $k_{15}$. It can be readily verified that each pair of nodes in the network illustrated in FIG. 1 share at least one master key initially. For example, nodes $n_1$ and $n_6$ both possess master key $k_1$ while $n_7$ and $n_{11}$ both possess $k_{21}$.

Suppose that in the network illustrated in FIG. 1, nodes $n_2$, $n_4$, $n_8$, $n_{10}$, and $n_{11}$ wish to establish a group key for a session with unique identifier u. Observe that nodes $n_2$, $n_4$, and, $n_{10}$ share the master key $k_5$ while nodes $n_8$, $n_{10}$, and $n_{11}$ share the master key $k_{11}$. A group key can be established between nodes $n_2$, $n_4$, $n_8$, $n_{10}$, and $n_{11}$ as follows:

Nodes $n_2$, $n_4$, and $n_{10}$ apply a common key derivation function to master key $k_5$ to obtain the session key $s_{5,u}$:

$$s_{5,u} \leftarrow \phi(k_5, u) \qquad \text{Equation (3)}$$

Nodes $n_8$, $n_{10}$, and $n_{11}$ apply a common key derivation function to master key $k_{11}$ to obtain the session key $s_{11,u}$:

$$s_{11,u} \leftarrow \phi(k_{11}, u) \qquad \text{Equation (4)}$$

Node $n_{10}$ now possesses both session keys. Node $n_{10}$ computes the exclusive or (XOR) of each bit of the session key $s_{5,u}$ and each bit of the session key $s_{11,u}$ to produce the message $m_{1,u}$:

$$m_{1,u} = s_{5,u} \oplus s_{11,u} \qquad \text{Equation (5)}$$

Node $n_{10}$ transmits the message $m_{1,u}$ to nodes $n_8$ and $n_{11}$. Upon receiving the message $m_{1,u}$, nodes $n_8$ and $n_{11}$ recover $s_{5,u}$ by computing:

$$m_{1,u} \oplus s_{11,u} = s_{5,u} \oplus s_{11,u} \oplus s_{11,u} = s_{5,u} \qquad \text{Equation (6)}$$

Nodes $n_2$, $n_4$, $n_8$, $n_{10}$, and $n_{11}$ now share $s_{5,u}$, which can be used as a group key.

Observe that in this simple example, a group key has been generated among 5 nodes via a single multicast transmission—i.e., the transmission by node $n_{10}$ of message $m_{1,u}$ to nodes $n_8$ and $n_{11}$. By using the session key $s_{11,u}$ as a one-time pad, the group key $s_{5,u}$ is secure from any eavesdropper that does not possess the master key $k_{11}$ (since $k_{11}$ is required to generate $s_{11,u}$.) Furthermore, by using the output of a KDF as the group key, rather than the master key directly, the security of the master keys is not reduced by this process. Specifically, no new nodes obtain any new master keys.

It is instructive to consider a second example where two transmissions are required to generated a group key among 5 nodes in this same network. Suppose that in the network illustrated in FIG. 1, nodes $n_1$, $n_5$, $n_6$, $n_9$, and $n_{11}$ wish to establish a group key for a session with unique identifier v. Observe that nodes $n_5$, $n_6$, and $n_{11}$ share master key $k_6$, nodes $n_1$ and $n_6$ share master key $k_1$, and nodes $n_1$ and $n_9$ share master key $k_4$. A group key can be established among nodes $n_1$, $n_5$, $n_6$, $n_9$, and $n_{11}$ as follows:

Nodes $n_5$, $n_6$, and $n_{11}$ apply a common key derivation function to master key $k_6$ to obtain the session key $s_{6,v}$:

$$s_{6,v} \leftarrow \phi(k_6, v) \qquad \text{Equation (7)}$$

This session key will be the group key since it is already shared by 3 of the nodes.

Nodes $n_1$ and $n_6$ apply a common key derivation function to master key $k_1$ to obtain the session key $s_{1,v}$:

$$s_{1,v} \leftarrow \phi(k_1, v) \qquad \text{Equation (8)}$$

Nodes $n_1$ and $n_9$ apply a common key derivation function to master key $k_4$ to obtain the session key $s_{4,v}$:

$$s_{4,v} \leftarrow \phi(k_4, v) \qquad \text{Equation (9)}$$

Node $n_6$, which possesses session keys $s_{6,v}$ and $s_{1,v}$, computes and transmits the message $m_{1,v}$ to node $n_1$ where:

$$m_{1,v} = s_{6,v} \oplus s_{1,v} \qquad \text{Equation (10)}$$

Upon receiving the message $m_{1,v}$, node $n_1$ recovers the group key $s_{6,v}$ via:

$$m_{1,v} \oplus s_{1,v} = s_{6,v} \oplus s_{1,v} \oplus s_{1,v} = s_{6,v} \qquad \text{Equation (11)}$$

Node $n_1$, which now possesses session keys $s_{6,v}$ and $s_{4,v}$, computes and transmits the message $m_{2,v}$ to node $n_9$ where:

$$m_{2,v} = s_{6,v} \oplus s_{4,v} \qquad \text{Equation (12)}$$

Upon receiving the message $m_{2,v}$, node $n_9$ recovers the group key $s_{6,v}$ via:

$$m_{2,v} \oplus s_{4,v} = s_{6,v} \oplus s_{4,v} \oplus s_{4,v} = s_{6,v} \qquad \text{Equation (13)}$$

In this example, a group key has been generated among 5 nodes via two multicast transmissions. By using the session keys $s_{1,v}$ and $s_{4,v}$ as one-time pads for the transmission of session key $s_{6,v}$, the group key $s_{6,v}$ is secure from any eavesdropper that possesses neither master key $k_1$ nor master key $k_4$.

In order to describe the embodiments used to develop the examples in paragraphs [0020] and [0021], some terminology will be introduced. Without loss of generality, the nodes in a network and the master keys are indexed by natural numbers. The master key repository $K_p$ at node $n_p$ is defined as the indices of the master keys possessed by that node. In the example illustrated in FIG. 1, the 11 master key repositories are:

$K_1=\{1,2,4,11,15\}, K_2=\{2,3,5,12,16\}, K_3=\{3,4,6,13,17\}, K_4=\{4,5,7,14,18\}, K_5=\{5,6,8,15,19\}, K_6=\{1,6,7,9,16,20\}, K_7=\{2,7,8,10,17,21\}, K_8=\{3,8,9,11,18\}, K_9=\{4,9,10,12,19\}, K_{10}=\{5,10,11,13,20\}, K_{11}=\{6,11,12,14,21\}.$

In some embodiments, is assumed that every node in the network is aware of the master key repositories at every other node in the network. In the example illustrated in FIG. 1, node $n_1$ would therefore know that node $n_2$ possesses master keys $k_2$, $k_3$, $k_5$, $k_{12}$, and $k_{16}$, but, of that set, would only know the contents of master key $k_2$.

The node incidence set $N_q$ associated with the master key $k_1$ is the indices of the nodes that possess that master key. By definition, the node incidence set $N_q$ contains the element p if the master key repository $K_p$ contains the element q. In the example illustrated in FIG. 1, the 21 node incidence sets are:

$N_1=\{1,6\}, N_2=\{1,2,7\}, N_3=\{2,3,8\}, N_4=\{1,3,4,9\},$
$N_5=\{2,4,5,10\}, N_6=\{3,5,6,11\}, N_7=\{4,6,7\}, N_8=\{5,7,8\}, N_9=\{6,8,9\}, N_{10}=\{7,9,10\}, N_{11}=\{1,8,10,11\},$
$N_{12}=\{2,9,11\}, N_{13}=\{3,10\}, N_{14}=\{4,11\}, N_{15}=\{1,5\}, N_{16}=\{2,6\}, N_{17}=\{3,7\}, N_{18}=\{4,8\}, N_{19}=\{5,9\},$
$N_{20}=\{6,10\}, N_{21}=\{7,11\}.$

Finally, the occupancy set $O_{r,x}$ associated with master key $k_r$ for a session x to be established between a group of T nodes $n_{g1}, n_{g2}, \ldots, n_{gT}$ is the intersection of the node incidence set $N_r$ and the indices of the nodes in the group $\{g1, g2, \ldots, gT\}$. As will be made clear below, only occupancy sets with a size of at least two are germane in some embodiments. In the example discussed in paragraph [0020], the occupancy sets containing at least two elements are:

$$O_{3,u}=\{2,8\}, O_{5,u}=\{2,4,10\}, O_{11,u}=\{8,10,11\}, O_{12,u}=\{2,11\}, O_{14,u}=\{4,11\}, O_{18,u}=\{4,8\}.$$

In the example discussed in paragraph [0021], the occupancy sets containing at least two elements are:

$$O_{1,v}=\{1,6\}, O_{4,v}=\{1,9\}, O_{6,v}=\{5,6,11\}, O_{9,v}=\{6,9\},$$
$$O_{11,v}=\{1,11\}, O_{12,v}=\{9,11\}, O_{15,v}=\{1,5\},$$
$$O_{19,v}=\{5,9\}.$$

In some embodiments, a set of master keys may first be generated and distributed amongst the nodes in a wireless network such that two conditions are met:
1) Every pair of nodes in the network possesses at least one of the master keys in common.
2) Every node in the network is aware of the indices of the master keys possessed by every other node in the network.

When a group of T nodes $n_{g1}, n_{g2}, \ldots, n_{gT}$ wish to establish a cryptographic key for a secure communications session with unique identifier y, each member of the group may compute the occupancy sets associated with each master key that is possessed by at least two members of the group. Every member of the group $n_{g1}, n_{g2}, \ldots, n_{gT}$ may now possess a common set of occupancy sets $O_{\alpha 1,y}, O_{\alpha 2,y}, \ldots, O_{\alpha Y,y}$, where $k_{\alpha 1}, k_{\alpha 2}, \ldots, k_{\alpha Y}$ is the Y-sized subset of the master keys that are possessed by at least two members of the group.

In other embodiments, there may exist a node in the group that does not share at least one of the master keys in common with any other node in the group. This node may conduct a secure unicast session with at least one other node in the group in order to jointly establish knowledge of a master key, thereby satisfying the first condition specified in paragraph [0025]. In an example, the secure unicast session may be a Diffie-Hellman key exchange. This node may now participate in establishing a cryptographic key for a secure communications session in the network.

Every member of the group $n_{g1}, n_{g2}, \ldots, n_{gT}$ may apply a common procedure to identify a common ordered subset of the master key set $\{k_{\lambda 0}, k_{\alpha 1}, \ldots, k_{\alpha S}\}$ satisfying two conditions:
1) Each node in the group possesses at least one of the keys in the ordered subset.
2) For each $i=1, \ldots, S$, the master key $k_{\lambda,i}$ is possessed by at least one node which also possesses at least one of the master keys $k_{\lambda,j}$ for $j=0, \ldots, i-1$.

In an embodiment, the common ordered subset may be identified using the following steps:

An occupancy set with the largest size may be chosen from the common set of occupancy sets. In the event that there is more than one occupancy set with the largest size, then the occupancy set corresponding to the master key with lowest index among those with largest size may be chosen. The master key associated with the chosen occupancy set may be the first element of the common ordered subset of the master key set.

The node indices contained in the occupancy set chosen in the previous step may be denoted the covered subset and those not contained in the occupancy set may be denoted the uncovered subset.

The following steps may be repeated until the uncovered subset is empty:

An occupancy set from the common set of occupancy sets may be chosen such that:
1) The chosen occupancy set contains at least one element in common with the covered subset.
2) The chosen occupancy set contains the largest number of elements in common with the uncovered subset among all occupancy sets.

In the event that there is more than one occupancy set meeting these criteria, the occupancy set corresponding to the master key with lowest index may be chosen.

The master key associated with the chosen occupancy set may be the next element of the common ordered subset of the master key set.

Any node index contained in the chosen index set that was not previously contained in the covered subset may be added to the covered subset.

Any node index contained in the covered subset and the uncovered subset may be removed from the uncovered subset.

Every member of the group $n_{g1}, n_{g2}, \ldots, n_{gT}$ may identify a common ordered subset of the master key set $\{k_{\lambda,0}, k_{\lambda,1}, \ldots, k_{\lambda,S}\}$ that satisfies these conditions. All nodes possessing master key $k_{\lambda,0}$ may apply a common key derivation function to that master key to obtain a session key:

$$s_{\lambda,0,y} \leftarrow \phi(k_{\lambda,0}, y) \qquad \text{Equation (14)}$$

The session key $s_{\lambda,0,y}$ is the group key.

The group key may be distributed to the remaining group members by repeating the following steps for each value of $i=1, \ldots, S$:

Every group member in possession of master key $k_{\lambda,i}$ may apply a common key derivation function to that master key to obtain the corresponding session key:

$$s_{\lambda,i,y} \leftarrow \phi(k_{\lambda,i}, y) \qquad \text{Equation (15)}$$

One node possessing both the group key $s_{\lambda,0,y}$ and the session key $s_{\lambda,i,y}$ may compute and transmit the message:

$$m_{i,y} = s_{\lambda,0,y} \oplus s_{\lambda,i,y} \qquad \text{Equation (16)}$$

If multiple nodes possess both $s_{\lambda,0,y}$ and $s_{\lambda,i,y}$, then the node with the smallest index may be chosen to be the transmitter.

Upon reception of message $m_{i,y}$, every group member in possession of the session key $s_{\lambda,i,y}$ but not the group key $s_{\lambda,0,y}$ may recover the group key by computing:

$$m_{i,y} \oplus s_{\lambda,i,y} = s_{\lambda,0,y} \oplus s_{\lambda,i,y} \oplus s_{\lambda,i,y} = s_{\lambda,0,y} \qquad \text{Equation (17)}$$

The group key is first XORed with a session key prior to each transmission. In this manner, the session keys act as one-time pads for the secure communication of the group key. Any eavesdropper not possessing the session key $s_{\lambda,i}$ will therefore not be able to recover the group key from message $m_{i,y}$. More generally, any eavesdropper not possessing at least one of the master keys in the common ordered subset $\{k_{\lambda,0}, k_{\lambda,1}, \ldots, k_{\lambda,S}\}$ cannot use the messages $m_{1,y}, m_{2,y}, \ldots, m_{S,y}$ to recover the group key.

In the example described in paragraph [0020], nodes $n_2, n_4, n_8, n_{10},$ and $n_{11}$ wished to establish a group key for a session with unique identifier u. The occupancy sets for this example are:

$$O_{3,u}=\{2,8\}, O_{5,u}=\{2,4,10\}, O_{11,u}=\{8,10,11\}, O_{12,u}=\{2,11\}, O_{14,u}=\{4,11\}, O_{18,u}=\{4,8\}.$$

The procedure described above may be applied to identify the ordered subset as follows:

The largest occupancy sets are $O_{5,u}$ and $O_{11,u}$. Since $O_{5,u}$ corresponds to a master key with lowest index, $O_{5,u}$ is chosen. The first element of the ordered subset is $k_5$.

The covered subset is initialized to $\{2,4,10\}$ and the uncovered subset is initialized to $\{8,11\}$.

The occupancy set $O_{11,u}$ is chosen since it contains at least one covered element and both uncovered elements. The second element of the ordered subset is $k_{11}$.

The covered subset is now updated to be $\{2,4,8,10,11\}$ and the uncovered subset is empty, thus completing the procedure.

The procedure described in paragraph [0029] may be applied to the ordered subset $\{k_5, k_{11}\}$ to yield the messaging described in paragraph [0020].

Similarly, in the example described in paragraph [0021], nodes $n_1, n_5, n_6, n_9$, and $n_{11}$ wished to establish a group key for a session with unique identifier v. The occupancy sets for this example are:

$$O_{1,v}=\{1,6\}, O_{4,v}=\{1,9\}, O_{6,v}=\{5,6,11\}, O_{9,v}=\{6,9\},$$
$$O_{11,v}=\{1,11\}, O_{12,v}=\{9,11\}, O_{15,v}=\{1,5\},$$
$$O_{19,v}=\{5,9\}.$$

The procedure described above may be applied to identify the ordered subset as follows:

The largest occupancy set $O_{6,v}$ is chosen and the first element of the ordered subset is $k_6$.

The covered subset is initialized to $\{5,6,11\}$ and the uncovered subset is initialized to $\{1,9\}$.

The occupancy sets $O_{1,v}, O_{9,v}, O_{11,v}, O_{12,v}, O_{15,v}$, and $O_{19,v}$, all comprise one covered element and one uncovered element. Since $O_{1,v}$ corresponds to a master key with lowest index, $O_{1,v}$ is chosen. The second element of the ordered subset is thus $k_1$.

The covered subset is updated to be $\{1,5,6,11\}$ and the uncovered subset is updated to be $\{9\}$.

The occupancy sets $O_{4,v}, O_{9,v}, O_{12,v}$, and $O_{19,v}$, all comprise one covered element and one uncovered element. Since $O_{4,v}$ corresponds to a master key with lowest index, $O_{4,v}$, is chosen. The third element of the ordered subset is thus $k_4$.

The covered subset is now updated to be $\{1,5,6,9,11\}$ and the uncovered subset is empty, thus completing the procedure.

The procedure described in paragraph [0029] is then applied to the ordered subset $\{k_6, k_1, k_4\}$ to yield the messaging described in paragraph [0021].

As described above, a group of nodes may establish a group key, which may be used to derive a public key and a private key for use in a public key cryptosystem. In an embodiment, this group of nodes may distribute the public key to another set of nodes, which thereby possess the public key, but not the private key. These other nodes may encrypt messages using the public key, but only the initial group of nodes can decrypt messages with the private key.

SIMULATION RESULTS

In order to demonstrate the benefits of some embodiments, two numerical experiments were performed in a network of 91 nodes. In the first experiment, the master keys were generated and distributed as follows:

For each of the 4095 distinct pairs of nodes, a unique master key was generated and distributed to each pair of nodes. In this manner, it was ensured that each pair of nodes shared at least one common master key.

An additional 91 master keys were next generated. These keys were then distributed randomly among the nodes. Specifically, a given key was loaded on a given node with probability 1091.

This master key distribution is referred to as the "Pairwise+Random" distribution.

In the second experiment, 91 master keys were generated and distributed according to a deterministic distribution based on Singer difference sets to yield the following:

The master key repository at node $n_1$ was:

$$K_1 = \{2,3,5,11,29,51,58,63,79,83\}$$

The master key repository at node $n_2$ was:

$$K_2 = \{3,4,6,12,30,52,59,64,80,84\}$$

More generally, the master key repository at node$_j$ was:

$$K_j = \{((i+1)\%91)+1, ((i+2)\%91)+1, ((i+4)\%91)+1, ((i+10)\%91)+1, ((i+28)\%91)+1, ((i+50)\%91)+1, ((i+57)\%91)+1, ((i+62)\%91)+1, ((i+78)\%91)+1, ((i+82)\%91)+1\}, \quad \text{Equation (18)}$$

where the notation a % b denotes the remainder when a is divided by b. This master key distribution is referred to as the "Deterministic" distribution. It can be verified that with this distribution each pair of nodes share exactly one master key in common.

Figure 2:
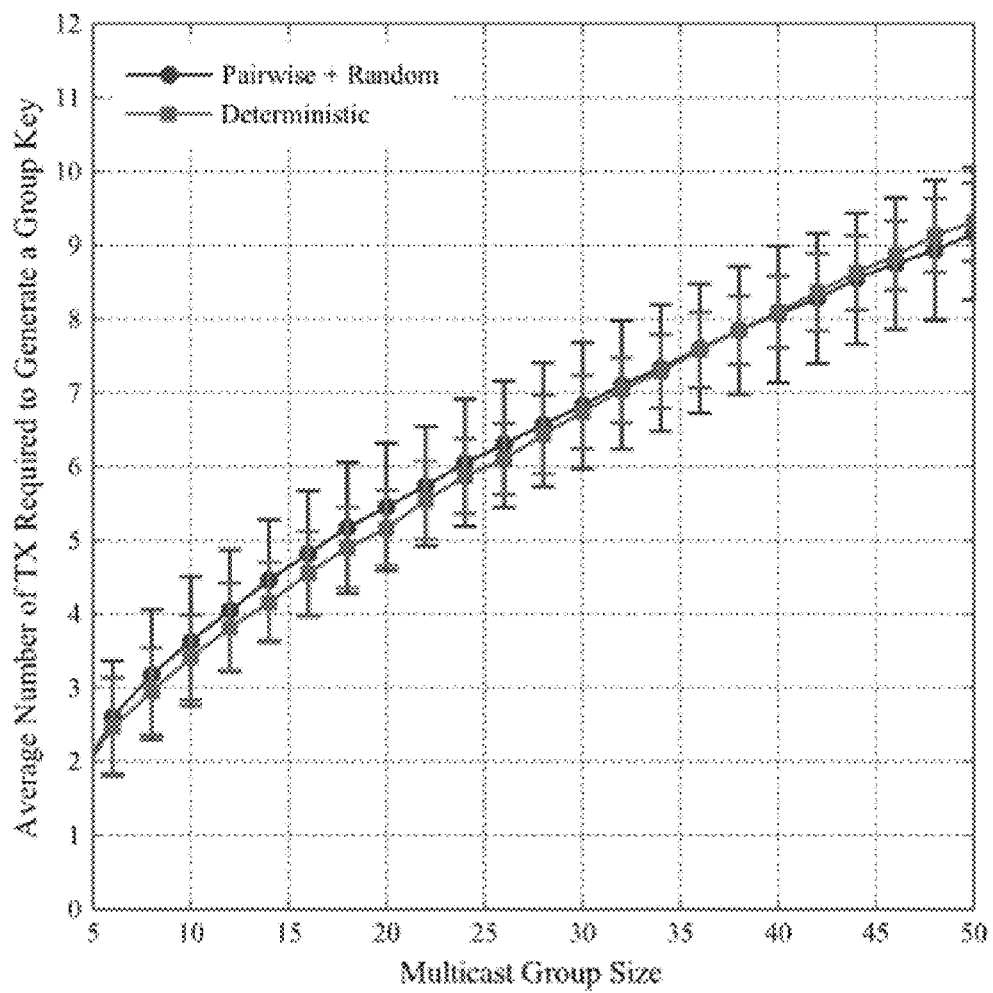
FIG. 2 plots the results of two Monte Carlo experiments used to illustrate the benefits of some embodiments. The two experiments differ in the initial distribution of master keys among a set of 91 nodes. The average number of transmissions required to generate a group key is illustrated as well as error bars indicating the empirical standard deviation of the measurements.

In both experiments, the average number of transmissions required to generate a group key using the preferred embodiment of the invention was measured via a Monte Carlo simulation as a function of the group size. FIG. 2 illustrates the results of these experiments. Observe in FIG. 2 that the number of transmissions required to generate a group key among a set of T nodes is consistently much less than T. For example, the average number of transmissions required to generate a group key among 20 nodes is approximately 5 for both packet distributions.

While the "Deterministic" and "Random+Pairwise" distributions yield similar performance in terms of the number of transmissions required to generate a group key, depending on the application, one distribution may be preferred over the other. If memory resources are precious, then the "Deterministic" distribution is preferable since each node possesses fewer keys and can compute node incidence sets on the fly. If node compromise is a concern, then the "Random+Pairwise" distribution is preferable since no re-keying is required when a node is compromised. Specifically, suppose an adversary gains access to a node. The remaining nodes must then discard any master keys possessed by that compromised node. If the "Random+Pairwise" key distribution is used, then the key distribution that remains after the compromised keys are removed still satisfies the requirements defined in paragraph [0026]. However, if the "Deterministic" distribution is used, then many pairs of nodes will no longer share a common key after the compromised keys are removed from the network.

Embodiments described herein are not limited to a specific method for determining the ordered subset of the master keys used for group key agreement. While in the embodiments in paragraphs [0025]-[0032], a specific procedure was used to obtain this ordered subset, as would be obvious to one of ordinary skill in the art, this greedy procedure is by no means unique.

In another embodiment, the ordered subset of the master keys used for group key agreement may be determined by solving a Set Cover problem as a first step. For example, in the example described in paragraph [0021], the occupancy sets $O_{4,v}$ and $O_{6,v}$ form a cover of the indices of the nodes in the group:

$$O_{4,v} \cup O_{6,v} = \{1,9\} \cup \{5,6,11\} = \{1,5,6,9,11\} \quad \text{Equation (19)}$$

In order to obtain an ordered subset from this set cover solution that satisfies the conditions described in paragraph [0027], an occupancy set containing an element in $O_{4,v}$ and $O_{6,v}$ may be be identified. For example, $O_{15,v} = \{1,5\}$. The resulting ordered subset is then $\{k_4, k_{15}, k_6\}$.

In yet another embodiment, there may be costs associated with each occupancy sets and the ordered subset of the master keys used for group key agreement may be determined in a manner that optimizes the total cost of group key agreement, rather than the total number of transmissions. In particular, the procedure described in paragraph [0027] can be updated to optimize the cost of the next occupancy set rather than to maximize the number of newly covered group members.

In an embodiment, the cost associated with each occupancy set can be the number of hops between any pair of transceivers in the occupancy set, and the procedure in paragraph
may be updated to minimize the number of hops of the next occupancy set.

It should be appreciated that some embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. In a wireless communication system comprising a plurality of transceivers and a plurality of keys $k_j$, where $j=1$ to $m$ and $m$ is a number of the plurality of keys, wherein the plurality of keys are distributed among the plurality of transceivers such that each pair of transceivers shares at least one of the plurality of keys, a method for secure key agreement among a first subset of the plurality of transceivers, the method comprising:

generating an ordered subset of the plurality of keys $k_{\lambda_p}$, where $p=0$ to $S$ and $S$ is less than $m$ and less than a number of transceivers in the first subset of the plurality of transceivers, wherein each of the first subset of the plurality of transceivers possesses at least one of the plurality of keys $k_{\lambda_p}$ from the ordered subset, and wherein at least one of the first subset of the plurality of transceivers possessing the key $k_{\lambda_q}$, where $q=1$ to $S$, also possesses at least one of the plurality of keys $k_{\lambda_r}$, where $r=0$ to $q-1$;

designating a key with index $\lambda_0$ as a group key;

transmitting a binary sum of the group key $k_{\lambda_0}$ and a key $k_{\lambda_s}$, where $s \neq 0$, from one or more of the first subset of the plurality of transceivers that possesses the group key $k_{\lambda_0}$ to others of the one or more of the first subset of the plurality of transceivers;

receiving the binary sum of the group key $k_{\lambda_0}$ and the key $k_{\lambda_s}$ at one or more of the first subset of the plurality of transceivers that possesses the key $k_{\lambda_s}$ and does not possess the group key $k_{\lambda_0}$; and recovering the group key $k_{\lambda_0}$ by computing a binary of sum of the key $k_{\lambda_s}$ and the binary sum of the group key $k_{\lambda_0}$ and the key $k_{\lambda_s}$.

2. The method of claim 1, wherein each of the plurality of keys is a session key, wherein the session key is derived from a master key using a common key derivation function and a unique identifier, and wherein the master key is generated using a pseudorandom number generator.

3. The method of claim 1, wherein each of the plurality of keys is a master key, and wherein the master key is generated using a pseudorandom number generator.

4. The method of claim 1, wherein generating the ordered subset comprises:

identifying an occupancy set for each of the plurality of keys possessed by the first subset of the plurality of transceivers, wherein the occupancy set $O_q$ comprises the set of transceivers of the first subset of the plurality of transceivers that possess the key $k_q$.

5. The method of claim 4, wherein generating the ordered subset further comprises:

selecting a largest of the plurality of occupancy sets; and setting the index of the largest of the plurality of occupancy sets as a first element of the ordered subset, wherein a covered set comprises elements of the selected largest occupancy set, and wherein an uncovered set comprises elements of the first subset of the plurality of transceivers that are not elements of the selected largest occupancy set.

6. The method of claim 5, wherein generating the ordered subset further comprises:

performing the following steps until the uncovered set is empty:

(i) selecting an occupancy set from the plurality of occupancy sets, wherein the selected occupancy set comprises one or more elements in the covered set, and wherein the number of common elements between the selected occupancy set and the uncovered set is maximized;

(ii) setting the index of the selected occupancy set as a next element of the ordered subset;

(iii) updating the covered set such that the covered set comprises each of the elements of the selected occupancy set; and (iv) updating the uncovered set by removing any elements that are in both the covered set and the uncovered set.

7. The method of claim 5, wherein a cost is associated with each of the plurality of occupancy sets, and wherein generating the ordered subset further comprises:

performing the following steps until the uncovered set is empty:

(i) selecting an occupancy set from the plurality of occupancy sets, wherein the cost associated with the selected occupancy set and the uncovered set is optimized;

(ii) setting the index of the selected occupancy set as a next element of the ordered subset;

(iii) updating the covered set such that the covered set comprises each of the elements of the selected occupancy set; and (iv) updating the uncovered set by removing any elements that are in both the covered set and the uncovered set.

8. The method of claim 7, wherein the cost is based on the number of hops between each pair of transceivers.

9. The method of claim 1, wherein the plurality of keys is distributed in a deterministic manner based on Singer difference sets.

10. The method of claim 1, wherein the plurality of keys is distributed in a pair-wise and random manner.

11. The method of claim 1, further comprising:
encrypting a message using a public key at one or more of a second subset of the plurality of transceivers; and
decrypting the message using a private key at one or more of the first subset of the plurality of transceivers,
wherein the public key and the private key are derived from the group key,
wherein each of the second subset of the plurality of transceivers possesses the public key and does not possess the private key, and
wherein each of the first subset of the plurality of transceivers possesses the public key and the private key.

12. A system for conducting secure key agreement in a wireless network, the system comprising:
a plurality of transceivers; and
a plurality of keys $k_j$, where j=1 to m and m is a number of the plurality of keys,
wherein the plurality of keys are distributed among the plurality of transceivers such that each pair of transceivers share at least one of the plurality of keys,
wherein a subset of the plurality of transceivers is capable of establishing a group key,
wherein each of the subset of the plurality of transceivers is capable of:
generating an ordered subset of the plurality of keys $k_{\lambda p}$, where p=0 to S and S is less than m and less than a number of transceivers in the first subset of the plurality of transceivers, wherein each of the subset of the plurality of transceivers possesses at least one of the plurality of keys $k_{\lambda p}$ from the ordered subset, and wherein at least one of the subset of the plurality of transceivers possessing the key $k_{\lambda s}$, where q=1 to S, also possesses at least one of the plurality of keys $k_{\lambda r}$ where r=0 to q−1,
designating a key with index $\lambda 0$ as the group key, and
transmitting a binary sum of the group key $k_{\lambda 0}$ and a key $k_{\lambda s}$, where s≠0, from one or more of the subset of the plurality of transceivers that possesses the group key $k_{\lambda 0}$ to other of the one or more of the subset of the plurality of transceivers;
wherein each of the subset of the plurality of transceivers that possesses the key $k_{\lambda s}$ and does not possess the group key $k_{\lambda 0}$ is further capable of:
receiving the binary sum of the group key $k_{\lambda 0}$ and the key $k_{\lambda s}$; and
recovering the group key $k_{\lambda 0}$ by computing a binary of sum of the key $k_{\lambda s}$ and the binary sum of the group key $k_{\lambda 0}$ and the key $k_{\lambda s}$.

13. The system of claim 12, wherein generating the ordered subset comprises:
identifying an occupancy set for each of the plurality of keys possessed by the subset of the plurality of transceivers, wherein the occupancy set $O_q$ comprises the set of transceivers that possess the key $k_q$.

14. The system of claim 13, wherein generating the ordered subset further comprises:
selecting a largest of the plurality of occupancy sets; and
setting the index of the largest of the plurality of occupancy sets as a first element of the ordered subset, wherein a covered set comprises elements of the selected largest occupancy set, and wherein an uncovered set comprises elements of the subset of the plurality of transceivers that are not elements of the selected largest occupancy set.

15. The system of claim 14, wherein generating the ordered subset further comprises:
performing the following steps until the uncovered set is empty:
(i) selecting an occupancy set from the plurality of occupancy sets, wherein the selected occupancy set comprises one or more elements in the covered set, and wherein the number of common elements between the selected occupancy set and the uncovered set is maximized;
(ii) setting the index of the selected occupancy set as a next element of the ordered subset;
(iii) updating the covered set such that the covered set comprises each of the elements of the selected occupancy set; and
(iv) updating the uncovered set by removing any elements that are in both the covered set and the uncovered set.

16. The system of claim 12, wherein the plurality of keys is distributed in a deterministic manner based on Singer difference sets.

17. The system of claim 12, wherein the plurality of keys is distributed in a pair-wise and random manner.

18. In a wireless communication system comprising a plurality of transceivers and a plurality of keys $k_j$, where j=1 to m and m is a number of the plurality of keys, a method for secure key agreement among a subset of the plurality of transceivers, the method comprising:
identifying one or more of the subset of the plurality of transceivers that do not share at least one of the plurality of keys with at least one other of the subset of the plurality of transceivers;
exchanging at least one of the plurality of keys via a secure unicast session to ensure that each pair of transceivers share at least one of the plurality of keys;
generating an ordered subset of the plurality of keys $k_{\lambda p}$, where p=0 to S and S is less than m and less than a number of transceivers in the subset of the plurality of transceivers, wherein each of the subset of the plurality of transceivers possesses at least one of the plurality of keys $k_{\lambda p}$ from the ordered subset, and wherein at least one of the subset of the plurality of transceivers possessing the key $k_{\lambda q}$, where q=1 to S, also possesses at least one of the plurality of keys k where r=0 to q−1;
designating a key with index $\lambda 0$ as a group key;
transmitting a binary sum of the group key $k_{\lambda 0}$ and a key $k_{\lambda s}$, where s≠0, from one or more of the first subset of the plurality of transceivers that possesses the group key $k_{\lambda 0}$ to others of the one or more of the first subset of the plurality of transceivers;

receiving the binary sum of the group key $k_{\lambda,0}$ and the key $k_{\lambda,s}$ at one or more of the subset of the plurality of transceivers that possesses the key k and does not possess the group key $k_{\lambda,0}$; and recovering the group key $k_{\lambda,0}$ by computing a binary of sum of the key k and the binary sum of the group key $k_{\lambda,0}$ and the key $k_{\lambda,s}$.

19. The method of claim 18, wherein the secure unicast session is a Diffie-Hellman key exchange.

* * * * *